Jan. 27, 1953  R. J. SERVICE  2,626,483
VENTILATED PLANT PROTECTOR
Filed July 28, 1950
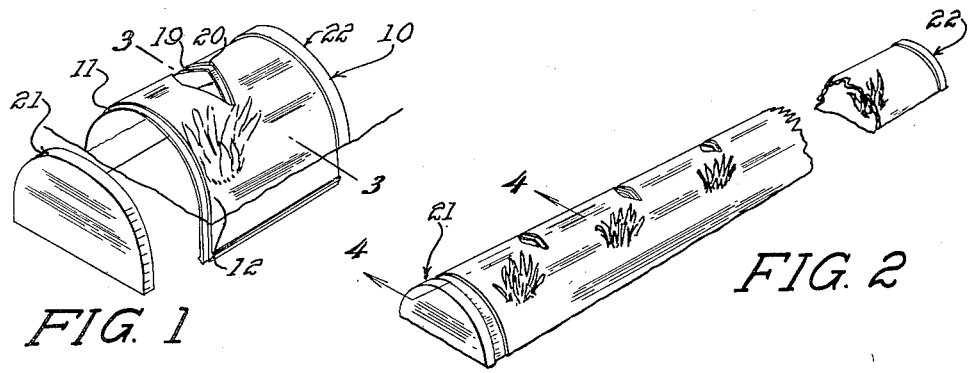
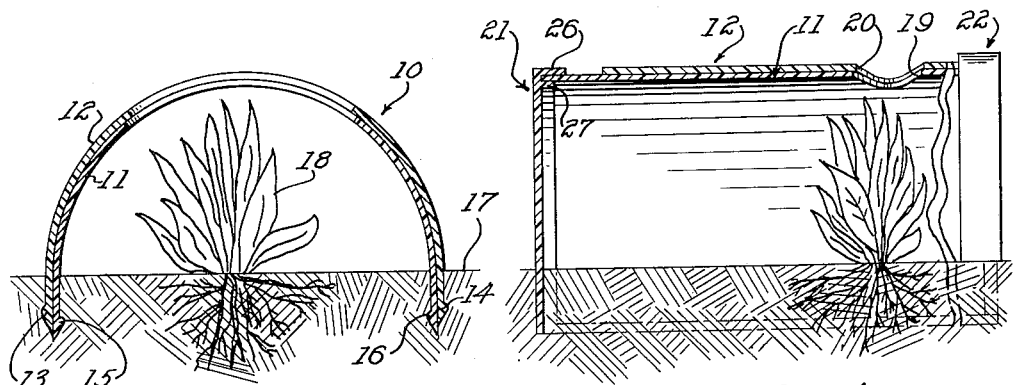
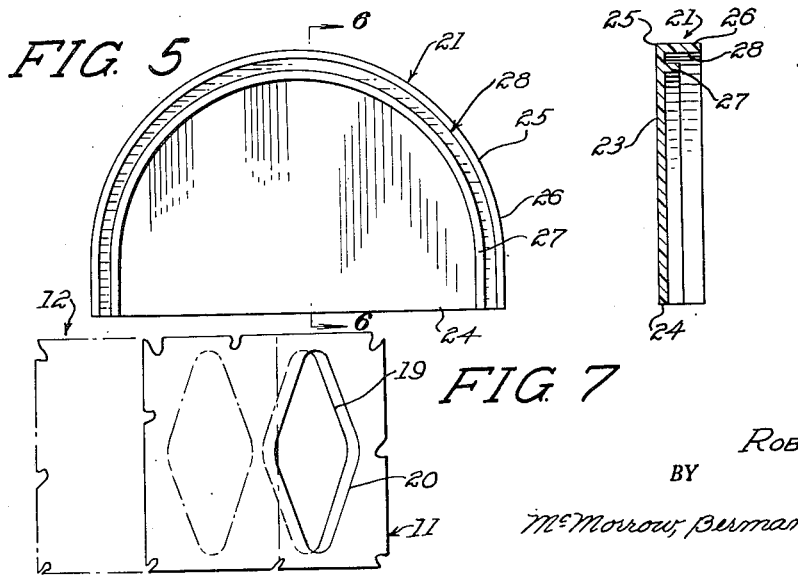
INVENTOR.
ROBERT J. SERVICE
BY
McMorrow, Berman + Davidson
ATTORNEYS Patented Jan. 27, 1953

2,626,483

UNITED STATES PATENT OFFICE 2,626,483

VENTILATED PLANT PROTECTOR

Robert J. Service, Stone Ridge, N. Y.

Application July 28, 1950, Serial No. 176,390

2 Claims. (Cl. 47—30)

This invention relates to plant husbandry devices, and more particularly to a ventilated plant protector.

An object of this invention is to provide a plant protector which can be quickly and easily supported in covering relation with respect to one or several rows of plants.

Another object of this invention is to provide a ventilated plant protector in which the ventilation of the protected plants can be manually controlled with speed and facility in accordance with varying weather conditions.

A further object of this invention is to provide a plant husbandry device which is particularly adapted for the preparation of soil for early planting, wherein it is desirable to have the soil to be planted relatively warm and dry.

A still further object of this invention is to provide a ventilated plant protector which is relatively simple in structure and cheap to manufacture.

The above and other objects and advantages of the invention will become apparent upon consideration of the following detailed description of the invention, when taken in conjunction with the accompanying drawings, wherein:

Figure 1 is a perspective view of the ventilated plant protector of the present invention, shown covering a single plant;

Figure 2 is a perspective view of the ventilated plant protector of the present invention, shown covering a row of plants;

Figure 3 is a sectional view taken along the line 3—3 of Figure 1;

Figure 4 is a fragmentary sectional view taken substantially along the line 4—4 of Figure 2;

Figure 5 is an elevational view of a closure forming a part of the ventilated plant protector of the present invention;

Figure 6 is a sectional view taken along the line 6—6 of Figure 5; and

Figure 7 is a fragmentary top plan view of the ventilated plant protector, showing the ventilating apertures slightly out of registry with respect to each other.

Referring now more particularly to the drawings, wherein like reference numerals have been used throughout the several views to designate like parts, there is shown the plant protector of the present invention, generally designated by the reference numeral 10, which includes a first open-ended cover section or hood 11 which is arcuate in cross-section and is fabricated of any suitable, transparent, flexible material. The width of the cover section 11 is determined by the span necessary to cover the particular type of plant life which is to be sheltered, while the length is determined by whether the protector is to be used to cover a single plant, as shown in Figure 1, or a row of plants, as shown in Figure 2. It is to be noted that the span of the cover section 11 may be selected to cover adjacent parallel rows of plant life.

Circumposed about the first cover section 11 is a second cover section or hood 12 which is shaped complementary to the first cover section 11 and is mounted on the latter for sliding movement longitudinally thereof. The second cover section 12 is similarly fabricated of a transparent, flexible material and has its free side edges 13, 14 terminating in confronting relation with respect to the free side edges 15, 16 of the first cover section 11. As clearly shown in Figure 3, the opposed free side edges of the first and second cover sections 11, 12 are shaped for ready insertion into the ground surface 17 on opposite sides of the plant 18.

At spaced intervals along its length, the first cover section 11 is provided with a plurality of ventilating apertures, generally designated by the reference numeral 19, each of the ventilating apertures being in the shape of a rhombus having its obtuse angles disposed along the longitudinal center line of the cover section 11. Similarly spaced longitudinally of the second cover section 12, there is provided a second plurality of ventilating apertures, generally designated by the reference numeral 20, the last-named apertures being generally rhomboidal in shape. As clearly shown in Figure 2, the registrable apertures 19, 20 may be spaced longitudinally of the cover sections 11, 12 so that a registrable pair of apertures immediately overlies the adjacent one of the plants 18 of the row of plants. Accordingly, upon effecting the sliding movement of the cover section 12 longitudinally of the cover section 11, the apertures 20 can be brought into and out of a position of registry with the apertures 19. The select position of movement of the cover section 12 will be predetermined by the particular weather conditions and the stage of growth of the protected plants.

It is to be noted that the over-all length of the cover section 11 is slightly greater than that of the cover section 12. The ends of the cover section 11 therefore slightly project beyond the adjacent ends of the cover section 12. Disposed in bridging relation with respect to each of the open ends of the cover section 11 and supported on the projecting ends thereof are the closures 21, 22. Since the structure of each of the closures 21, 22 is the same, only one will be described in detail.

Referring now with particularity to Figures 5 and 6, there is shown the closure 21 which is fabricated of any suitable material, and is shaped to conform to the arcuate cross-section of the cover section 11. The cover 21 includes a backing plate 23 having a straight lower edge 24 for the insertion into the ground 17 and having an arcuate marginal edge 25. Extending along the arcuate marginal edge 25 of the backing plate 23 and fixedly secured transversely thereof is an outer flange 26. Disposed inwardly of the outer flange 26 in spaced, confronting relation therewith is an inner flange 27 which likewise is secured transversely of the backing plate 23. The outer and inner flanges 26, 27 and the adjacent portions of the backing plate 23 cooperate together to form a channelway 28 for embracingly receiving and supporting the adjacent end of the cover section 11. Accordingly, each of the closures 21, 22 can be quickly and readily assembled with the adjacent projecting end of the cover section 11 to thereby effectively close the open ends of the latter.

In actual use, the protector 10 is assembled by circumposing the cover section 12 about the cover section 11. The closures 21, 22 are then mounted in bridging relation with respect to the open ends of the cover section 11 by inserting the projecting ends into the adjacent one of the guideways 28 of the closures. The aforementioned assembly is then placed over the plant or plants to be protected, and the free side edges of the cover sections 11, 12 and the straight lower edges 24 of the closures 21, 22 urged into the ground 17. Upon manually grasping the cover section 12, the disposition of the apertures 20 with respect to the apertures 19 can be varied to thereby control the ventilation for the covered plants. To disassemble the protector of the present invention, it is merely necessary to remove the closures 21, 22 from their supported positions and to urge the cover section 12 out of its position of embracing engagement with the cover section 11. It is to be noted, however, that for the purposes of storage, it is desirable to leave the cover sections 11 and 12 in their position of engagement with each other.

As previously pointed out, the protector of the present invention has numerous applications in plant husbandry and is readily adapted for use in conjunction with one or more plants. When the protector is positioned with respect to the ground surface 17, the plants are protected against bugs and the like, since a complete closure is formed except for the ventilating openings 19, 20.

Although only one embodiment of the plant protector of the present invention has been described, it is readily apparent that numerous modifications can be made without departing from the spirit of the invention as set forth in the appended claims.

What I claim is:

1. A protector for plants comprising a first upstanding open ended hood having its bounding edges adapted to be embedded in a ground surface, a closure bridging each of the open ends of said hood, each of said closures including a backing plate, a first flange projecting from the marginal edge of said backing plate, and a second flange positioned inwardly of and spaced from said first flange and secured to the adjacent portion of said backing plate and forming a channelway with said first flange for embracingly receiving the end portion of the adjacent one of the open ends of said hood, and a second upstanding hood conformably shaped to surroundingly embrace said first hood and having its bounding edges adapted to be embedded in said ground surface, said second hood being supported upon said first hood for longitudinal movement intermediate the first flanges of said closures, there being longitudinally spaced ventilating apertures provided in said first and second hoods and registrable with each other in selected positions of movement by the second hood relative to the first hood.

2. A protector for plants comprising a first upstanding open ended hood having its bounding edges adapted to be embedded in a ground surface, a closure bridging each of the open ends of said hood, each of said closures including a backing plate, a first flange projecting from the marginal edge of said backing plate, and a second flange positioned inwardly of and spaced from said first flange and secured to the adjacent portion of said backing plate and forming a channelway with said first flange for embracingly receiving the end portion of the adjacent one of the open ends of said hood, and a second upstanding hood conformably shaped to surroundingly embrace said first hood and having its bounding edges adapted to be embedded in said ground surface, said second hood being supported upon said first hood for longitudinal movement intermediate the first flanges of said closures, there being longitudinally spaced ventilating apertures provided in said first and second hoods and registrable with each other in selected positions of movement by the second hood relative to the first hood, the respective apertures in said first and second hood being positioned inwardly of and spaced from the bounding edge portions adapted to be embedded in the ground surface.

ROBERT J. SERVICE.

REFERENCES CITED

The following references are of record in the file of this patent:

UNITED STATES PATENTS

| Number | Name | Date |
|---|---|---|
| 541,695 | Smith | June 25, 1895 |
| 1,051,693 | Cowart | Jan. 23, 1913 |
| 1,621,440 | Stoddard | Mar. 15, 1927 |
| 2,109,426 | King | Feb. 22, 1938 |

FOREIGN PATENTS

| Number | Country | Date |
|---|---|---|
| 280,419 | Great Britain | Nov. 17, 1927 |